No. 608,371. W. H. CURTICE. Patented Aug. 2, 1898.
CABINET SIFTER.
(Application filed Apr. 18, 1898.)
(No Model.) 2 Sheets—Sheet 2.
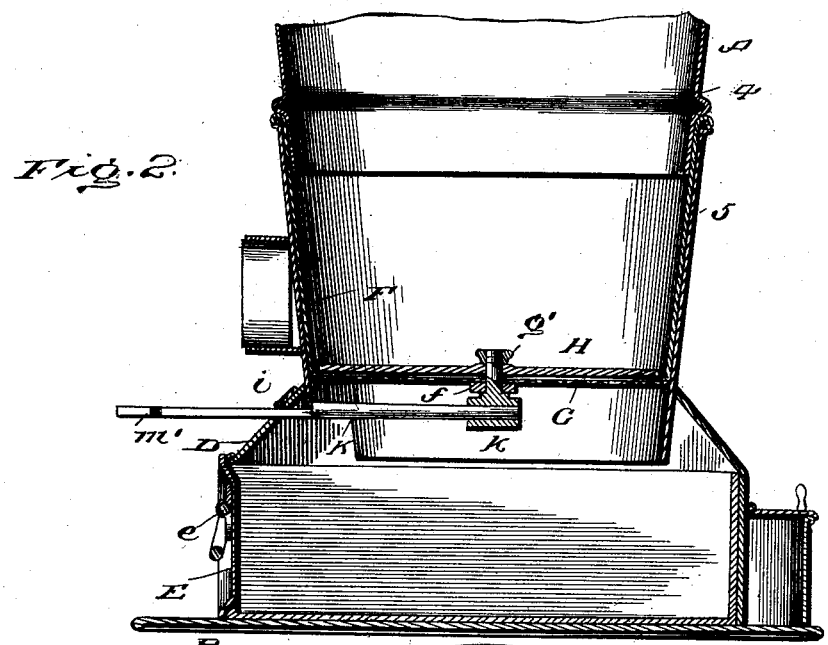
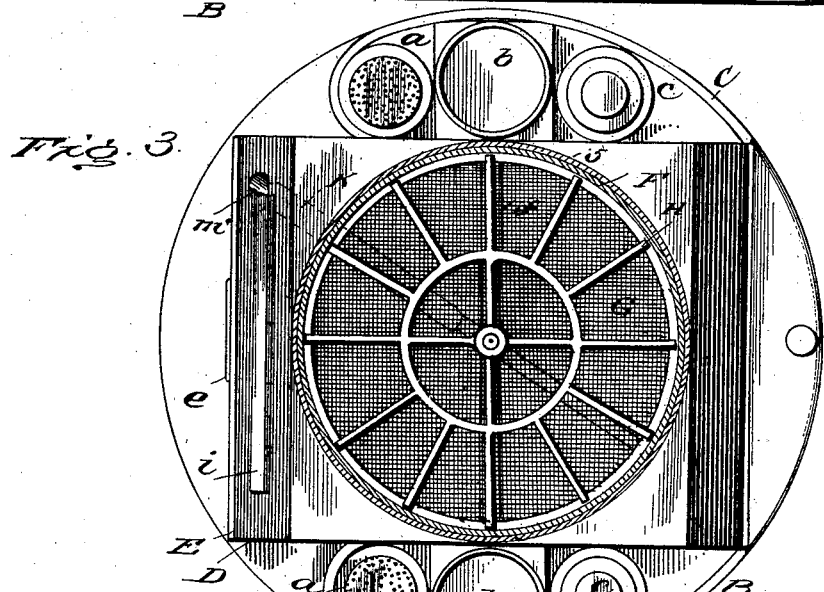

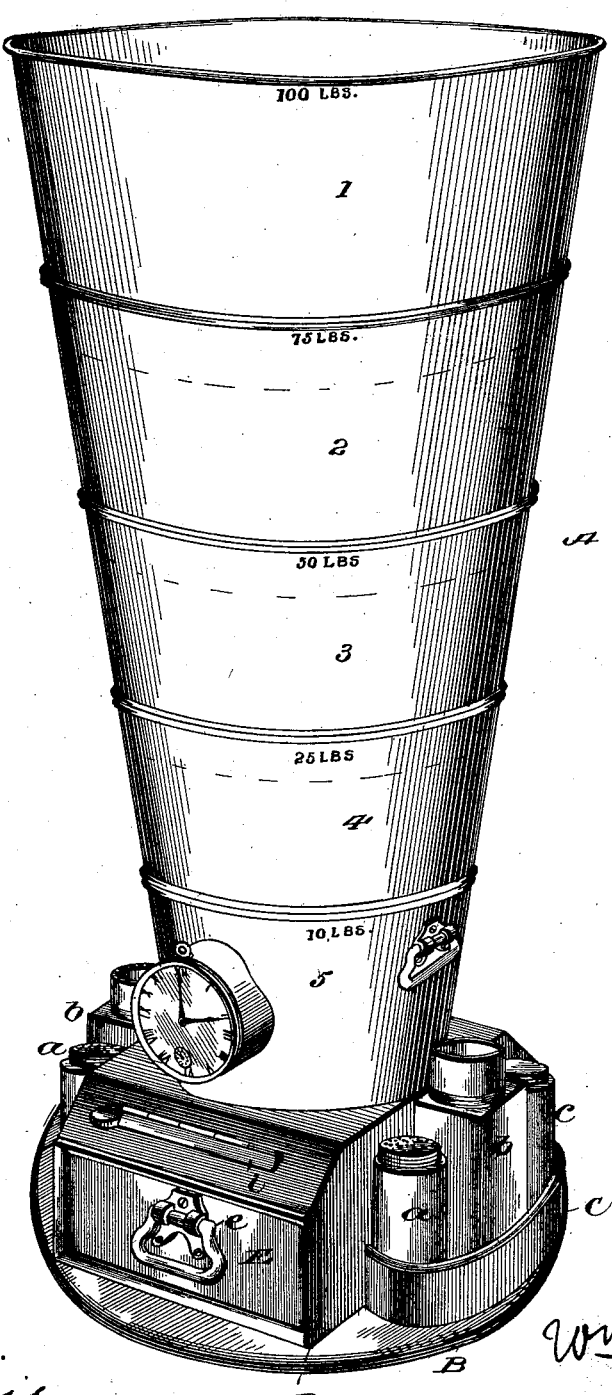

UNITED STATES PATENT OFFICE.

WILLIAM H. CURTICE, OF LOUISVILLE, KENTUCKY.

CABINET-SIFTER.

SPECIFICATION forming part of Letters Patent No. 608,371, dated August 2, 1898.

Application filed April 18, 1898. Serial No. 677,956. (No model.)

*To all whom it may concern:*

Be it known that I, WILLIAM H. CURTICE, a citizen of the United States, residing at Louisville, in the county of Jefferson and State of Kentucky, have invented certain new and useful Improvements in Cabinet-Sifters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in cabinet-sifters; and the object is to provide a device of this character for storing flour for domestic use, so as to be conveniently accessible when required for use.

To this end the invention consists in the construction, combination, and arrangement of the device, as will be hereinafter more fully described, and particularly pointed out in the claim.

In the accompanying drawings, Figure is a perspective view of my improved sifter. Fig. 2 is a vertical sectional view of the lower part of my invention, and Fig. 3 is a plan view showing the bottom of the sifter and the sifting mechanism. Fig. 4 shows certain parts in detail.

A represents the tank or receptacle, composed of telescopic sections (numbered 1, 2, 3, 4, and 5) of a predetermined capacity, indicated by the pound-marks on each respective section.

B is the supporting-base, preferably circular, though it may be of any desired shape or form. It is provided with pockets C, which, when my device is used for culinary purposes, may hold small vessels $a$ $b$ $c$, containing the necessary ingredients.

Between the tank proper and the base is a preferably square section D, which contains a drawer E, having a handle $e$. The lower tank-section rests upon the square section D, and within the section 5 is a cross-bar $f$, which supports a sieve G and a partially-rotatable grate or spider-like frame H, located immediately above but in close contact with the sieve. A short tube-section K, having a vertical threaded extension $g$, passes through the bar $f$, sieve G, and grate H and holds these parts in operative condition. That portion of extension $g$ which passes through the grate H is square in cross-section, the aperture in the grate being of like form. Above the drawer E is a transverse slot closed, except for a short distance at one end, by a hinged cover $i$.

K is a handle for operating the grate and is composed of a round smooth inner end $n$, a flat portion $n'$, which works in the transverse slot and is provided with a recess $m$ near its outer end, and a cut-in smooth portion $m'$. The handle when in use is inserted in piece K, the flat portion working in the slot, and when not in use it is fully turned to the left-hand side, the recess $m$ engaging the end wall of the slot, while the cover $i$, being closed, rests against the smooth portion $m'$. It will thus be seen that the handle is securely locked in position and cannot be moved until the cover is lifted.

I have shown five telescopic sections, but there may be as many of the sections as are desired. Their respective capacities may also vary as circumstances render necessary. As shown, their capacities are represented by pound-numbers "10," "25," "50," "75," and "100;" but any other ratio may exist and the first section may represent only a few pounds, if desired.

The lower section 5 carries a device for holding a clock. When flour or meal is sifted and stored in bags or sacks in the sifted condition, the operator can readily determine the progress of the work and how many bags can be filled in a specified time, and by these means can equitably adjust the price per bag for the laborer. Customers can order any number of bags of sifted flour, and the operator can tell to a minute when the desired number will be ready. As the capacity of each section is known, the number of pounds in each sack or bag can be accurately determined. When my invention is practiced in a more private way in the kitchen, it is often desirable to note the length of time an article should be subjected to certain conditions— for instance, of baking, boiling, &c.—or how long an article should be immersed in water. This will be accurately determined by the clock without danger of forgetting or neglecting the important element of time.

By making my tank in conical sections they can easily and readily be packed and crated, and the separable sections, after being nested or telescoped, are then inverted and laid on top of section D, thereby occupying but little space in storing or in transportation.

The operation of my invention is as follows: The required amount of flour having been put in the receptacle, which can be determined by the capacity of each section, the cover $i$ is then lifted, when the grate can be operated by the handle and the sifting process continued until the desired quantity has been obtained. Should all the sections be full and the upper one, for instance, contain twenty-five pounds, when the flour had fallen entirely out of that section it would be evident that approximately twenty-five pounds of flour would be the result.

In the process of sifting it will be understood that the sieve is fixed, while the grate vibrates.

What I claim, and desire to secure by Letters Patent, is—

In combination, the base and the rectangular section D, formed with the transverse slot, the cover $i$ hinged to said section D so as to leave one end of the said slot exposed when said cover is down, the conical section 5 mounted above said section D, the sieve G, fixed in said conical section, the grate H rotatably mounted above said sieve, the oscillating handle K' having its inner end operatively connected to said grate and having its outer end extending through said transverse slot, and formed at one side with a notch or recess $m$ adapted to engage the end wall of said transverse slot when the cover $i$ is down substantially as shown and described.

In testimony whereof I affix my signature in presence of two witnesses.

WILLIAM H. CURTICE.

Witnesses:
L. W. PULIES,
E. P. BITZER.